No. 790,411. PATENTED MAY 23, 1905.
E. L. WATROUS.
COMBINED PAN AND STOVE LID LIFTER.
APPLICATION FILED APR. 4, 1904.
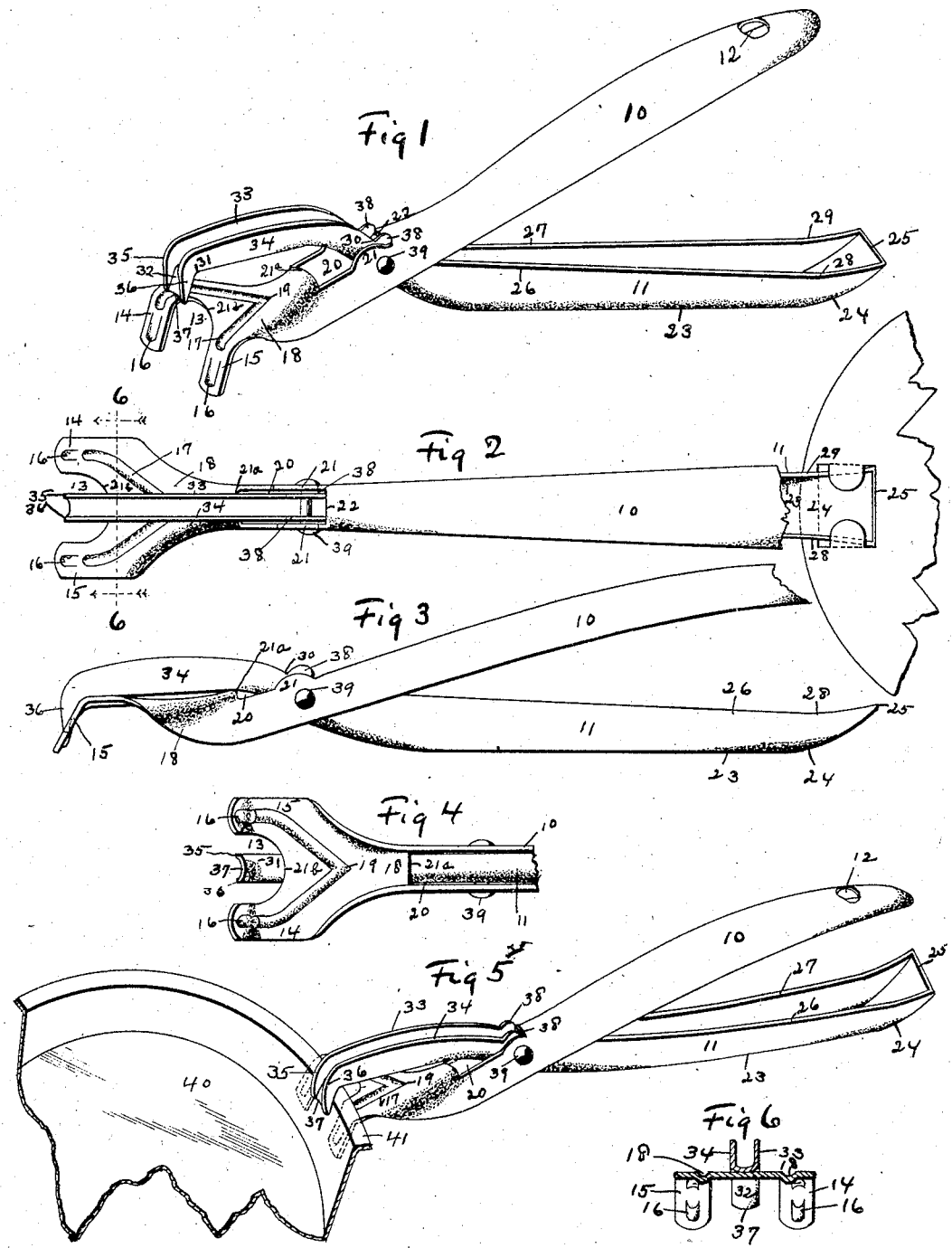
Witnesses.
K. K. Keffer.
A. G. Hague.
Inventor, E. L. Watrous.
by Orwig & Lane Attorneys.

No. 790,411. Patented May 23, 1905.

UNITED STATES PATENT OFFICE.

EDWARD L. WATROUS, OF DES MOINES, IOWA.

COMBINED PAN AND STOVE-LID LIFTER.

SPECIFICATION forming part of Letters Patent No. 790,411, dated May 23, 1905.

Application filed April 4, 1904. Serial No. 201,604.

*To all whom it may concern:*

Be it known that I, EDWARD L. WATROUS, a citizen of the United States, residing at Des Moines, in the county of Polk and State of Iowa, have invented a certain new and useful Combined Pan and Stove-Lid Lifter, of which the following is a specification.

The objects of my invention are to provide a combined pan and stove-lid lifter of simple, durable, and inexpensive construction which is designed to be stamped out of pieces of sheet metal in such a way as to provide a maximum amount of strength with a minimum amount of weight.

A further object is to provide means for limiting the movements of the operative parts of the device relative to each other, and, further, to provide jaws in the lifter which are so arranged and constructed that there will be no danger of bending these jaws even when lifting an article of great weight and when the jaws are forced toward each other by the long leverage of the handles, and at the same time to provide a jaw having two prongs which are bent downwardly a slight distance relative to the body portion between which the upper jaw is designed to operate, and, further, to provide a device in which the parts are pivoted to each other at a point where the lower handle will swing away from the upper handle when the upper handle is grasped.

A further object is to provide a stove-lid lifter by so shaping the free end of the lower handle which is adapted for lifting the ordinary stove-lid.

My invention consists in certain details in the construction, arrangement, and combination of the various parts of the device, whereby the objects contemplated are attained, as hereinafter more fully set forth, pointed out in my claim, and illustrated in the accompanying drawings, in which—

Figure 1 is a perspective view of the complete device. Fig. 2 is a plan view of the device, showing the stove-lid lifter in the ordinary stove-lid. A portion of the upper handle is broken away in this view. Fig. 3 is a side elevation of the device. A portion of the upper handle is also broken away in this view. Fig. 4 is an inverted plan view of the jaws of the device with the handles broken away. Fig. 5 shows in perspective the lifter in position for use on the ordinary pan, and Fig. 6 is a cross-sectional view cut on the line 6 6 of Fig. 2 looking in the direction indicated by the arrows in Fig. 2.

Referring to the accompanying drawings, the reference-numerals 10 and 11 indicate the handles. For the sake of convenience the handle 10 is designated as the "upper" handle and the handle 11 the "lower" handle. The upper handle is so constructed as to present a rounded upper surface and is hollow on its under surface, so that the upper portion of the handle proper is substantially semi-circular in cross-section. At the extreme free end of the upper handle there is an opening 12, designed to be used in hanging the device upon a nail or other supporting means. The forward end of the upper handle is considerably wider and is less curved in cross-section, and a portion of said forward end is cut out at 13 to form an opening between the prongs 14 and 15, which are bent downwardly a slight distance to form a portion of the lower jaw, which is formed at the extreme forward end of the handle 10. Each of these prongs has a depression 16 therein to strengthen it. A substantially V-shaped depression 17 is made in the substantially flat body portion 18 of the lower jaw to strengthen it, so that there will be no danger of bending said jaw when in use. This V-shaped depression 17 has its apex at 19, and the arms of the V extend to the prongs 14 and 15, so as to strengthen the upper portion of the prongs at the point where they are bent downwardly relative to the body portion 18. Cut out of the upper rounded portion of the handle 10 and immediately behind the body portion 18 of the jaw is a longitudinal slot 20. At each side of the slot and extending upwardly from the handle 10 is a curved projection 21, which projections are designed to strengthen the handle through that portion of it in which the slot 20 is cut out. By the depressions 16 and 17 and the curved rear part of the body portion 18 the lower jaw and the prongs and the body of the lower jaw are made exceedingly strong and the danger of bending the lower jaws when a great amount of pressure is brought to bear against them is obviated by the construction of this jaw. The portion of the handle forming the extreme rear end of the slot 21 is cut to form the straight edge 22, which is at right angles to the longitudinal center of the handle 10 for purposes hereinafter made clear. The body portion 18 is curved downwardly slightly from the forward edge 21ª of the slot 20 to the curved forward portion 21ᵇ of said body portion.

The lower handle 11 has the rounded lower portion 23, which is curved upwardly at 24 to form the straight rear edge 25. The sides 26 and 27, which are integral with the rounded bottom portion 23 and which are designed to strengthen the lower handle 11, are so constructed that the distance between these sides is at a maximum near the straight edge 25 and at a minimum at the rear of the upper jaw which forms a portion of said handle and is to be more fully described hereinafter, thus forming a handle member which is tapered from its extreme rear portion to its extreme forward portion. The sides 26 and 27 are curved downwardly slightly at 28 and 29, so that the rear portion of the lower handle can be used for a stove-lid lifter—that is, when the rear end of the lower handle 11 is used as a stove-lid lifter the straight edge 25 will engage said lid and the curved portion 24 of the rounded bottom 23 will engage said lid and the rounded portions 28 and 29 will engage said lid, thus forming a lid-lifter part which can easily be used for removing the lid from the stove. The forward portion of the lower handle 11 forms the upper jaw and said jaw is bent upwardly at 30 a slight distance from the lower handle of which it is a part, and then extends forwardly in a line substantially parallel with the upper edges of the sides 26 and 27 of the handle and then is bent downwardly at 31 to form the prong 32 of the upper jaw. The sides 26 and 27 of the handle extend forwardly throughout the length of the upper jaw, so that the upper jaw is substantially U-shaped in cross-section. The sides 26 and 27 in the jaw I have numbered 33 and 34 for the sake of convenience. The sides 33 and 34 extend downwardly to form the sides 35 and 36 of the prong 32 of the upper jaw, and these sides 35 and 36 are tapered from a maximum width at their upper portion to a minimum width at their lower portion, so that when the jaws are operated the prong will be very thin at its lower extremity. Owing to the fact that the lower portion of the upper jaw is slightly rounded at 37, the forward lower end of the prong 32 is slightly curved from its outer edges inwardly and rearwardly.

The shape of the jaws and the sides and bottom portion thereof is such that the upper jaw is very strong and cannot be easily bent, owing to the fact that the sides of said jaw strengthen it very materially, and there is but little danger of bending either the body of the jaw or the prong 32 when a great amount of pressure is brought to bear on the inner rear portion of the handle. The prong 32 is bent substantially at right angles to the body portion of said jaw and in this respect the prong 32 is different from the prongs 16, as it is also in other particulars, for the prongs 16 of the lower jaw are not bent at substantially right angles to the body portion 18, but they are bent downwardly at considerably less than at a right angle to the body portion, so that when the body portions of the upper and lower jaw are in engagement with each other the prong 32 and the prongs 16 are not parallel with each other.

Extending upwardly from each of the sides of the lower handle at the point where said handle is bent upwardly is a lug 38, the rear portion of which extends upwardly at substantially right angles to the sides 26 and 27 and the forward portions of which are rounded.

After the parts of the mechanism have been constructed as above described the upper jaw, which is at the forward end of the lower handle 11, is inserted through the slot 20 until the projections 38 are slightly in front of the straight edge 22 in the upper handle 10. A rivet or other pivot 39 is then passed through the upper handle 10 immediately beneath the projections 21 and through the sides of the lower handle 11 immediately beneath and slightly at the rear of the projections 38, thus enabling the handles to be swung apart, and at the same time swing the upper and lower jaws apart until the lugs 28 engage the straight edge 22 and limit the opening of the jaws and the pivotal movement of the handles away from each other. As the free ends of the handles 10 and 11 are drawn toward each other the rounded lower part of the body of the upper jaw is in engagement with the forward edge 21ª of the slot 20 and the extreme forward edge 21ᵇ of the lower jaw. The prong 32 will lie between the prongs 16, so that the rounded portion 37 of the prong 38 will be substantially in line with the rear portion of the jaws 16 and midway between the upper and lower portions thereof, as shown clearly in Figs. 4 and 6 of the drawings.

The advantage of the lugs 38, which are designed to limit the movement of the jaws and handles, is clearly obvious, for with these lugs in the exact position in which they are placed on the handle 11 and the way in which they engage the straight edge 22 in the handle 10 prevents the jaws from operating a great distance and also maintains the handles in such position relative to each other that both handles can be easily grasped by the operator with one hand in any position of their limit of movement. The advantage of having the jaws constructed and mounted in the way above described is also obvious, for while they are so constructed that a pan or other article placed between these jaws will be rigidly held between them and the danger of the article slipping from between these jaws is obviated, nevertheless, the article could not be broken by these jaws, owing to the slight amount of bend which would be caused by drawing the jaws to their closed position.

In practical operation and assuming that the ordinary pan 40, a portion of which is shown in Fig. 5, is designed to be grasped and the operator allows the upper and lower jaws to be separated and the prongs 16 placed in engagement with the exterior side of the pan in such a way that the rim 41 will rest on the forward end of the body portion 18 and then that the jaws are moved toward each other by drawing the free ends of the handles toward each other the rounded portion 37 at the lower end of the prong 32 of the upper jaw will engage that portion of the pan which is between the jaws 16 and cause said portion to be drawn rearwardly a slight distance between said jaws and the lower rounded portion of the body of the upper jaw to engage the rim 41, thus providing means for firmly holding the part between said jaws when the handles 10 and 11 are placed toward each other. On account of the great amount of leverage produced on the jaws by thus moving the handles toward each other owing to the comparative lengths of the handles and the jaws it is obvious that there will be no danger of bending these jaws, owing to their construction. When the device is used as a stove-lid lifter, the operator grasps the jaw end of the device and places the rear end of the lower handle in the stove-lid, as shown in Fig. 2, and the desired result may be accomplished.

Having thus described my invention, what I claim, and desire to secure by Letters Patent of the United States therefor, is—

An improved pan-lifter comprising two members, each formed complete of a single piece of sheet metal, one member comprising an upper handle portion of substantially inverted-U shape in cross-section, and a lower jaw portion, its rear end likewise of substantially inverted-U shape in section, and its top flattened and formed into two prongs diverging from each other, the ends of which incline downwardly and forwardly and are bowed forwardly, the said lifter member formed with an opening in its top at the intersection of the handle and jaw portions, the other lifter member comprising a bottom handle portion and a top jaw portion said handle portion substantially of U shape in cross-section, relatively narrow at its forward end, projected through the opening in the other member with its sides engaging the inner surfaces of the sides of the other member adjacent to said opening, a pivot-pin passed through said engaging portions of said lifter members, the jaw portion of said second lifter member likewise of substantially U shape in section, lugs formed on the top of the rear end of the upper jaw member shaped to engage the material of the upper handle member adjacent to its opening to limit the opening movement of the jaw members, and a prong extending downwardly from the forward end of said upper jaw member and standing between the forked ends of the other jaw member and bowed rearwardly.

EDWARD L. WATROUS.

Witnesses:
W. R. LANE,
J. B. SMUTNEY.